(12) United States Patent
Tomita

(10) Patent No.: US 6,356,228 B1
(45) Date of Patent: Mar. 12, 2002

(54) AUTOMATIC AIRPORT INFORMATION TRANSMITTING APPARATUS

(75) Inventor: Atsushi Tomita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/714,179

(22) Filed: Nov. 17, 2000

Related U.S. Application Data

(63) Continuation of application No. PCT/JP99/01488, filed on Mar. 24, 1999.

(51) Int. Cl.$^7$ .............................................. G01S 13/88
(52) U.S. Cl. ..................... 342/33; 342/26; 342/36; 342/37; 342/42; 342/52; 342/53; 342/55; 342/57; 342/58; 342/175; 342/195
(58) Field of Search ........................ 342/26–40, 42–45, 342/51, 52, 57, 58, 175–186, 190–191, 195, 53–55

(56) References Cited

U.S. PATENT DOCUMENTS

| | | | |
|---|---|---|---|
| 4,179,695 A | * 12/1979 | Levine et al. | 342/37 |
| 4,197,536 A | * 4/1980 | Levine | 342/37 |
| 4,360,795 A | 11/1982 | Hoff | |
| 4,454,510 A | * 6/1984 | Crow | 342/32 |
| 4,989,084 A | 1/1991 | Wetzel | |
| 5,073,779 A | * 12/1991 | Skogmo et al. | 342/37 |
| 5,670,961 A | 9/1997 | Tomita et al. | |

* cited by examiner

*Primary Examiner*—Bernarr E. Gregory
(74) *Attorney, Agent, or Firm*—Rothwell, Figg, Ernst & Manbeck

(57) ABSTRACT

There is provided an automatic airport information transmitting apparatus comprising: airport-inside-target detecting means for detecting a target inside an airport; target judging means for judging a target moved in a place within the airport, which is required to surveille an aircraft based upon target position information derived from the airport-inside-target detecting means; and transmitting means for transmitting information of the target inside the airport judged by the target judging means to an aircraft which is flying around the airport in a wireless manner. In a relatively small-scaled airport where no controller is present, the automatic airport information transmitting apparatus improves a flight security of aircraft which are flying around the airport and are landing at this airport.

10 Claims, 14 Drawing Sheets

98.10.19

AIRPLANES WITHIN AIRPORT:

AIRCRAFT 1    LANDING STRIP NO. 27    20 KNOTS SIZE LARGE

AIRCRAFT 2    SPOT 3    5 KNOTS SIZE SMALL

AIRPORT WEATHER INFORMATION:

PRECIPITATION STRENGTH  16mm/h
    PRECIPITATION  20mm
    WIND DIRECTION  SOUTH-SOUTHEAST  WIND DIRECTION 3 KNOTS
    VISIBILITY  2 MILES
    TEMPERATURE  25°
    HUMIDITY  60%

PERIPHERAL AIRPLANES:

AIRCRAFT 1    EAST LONGITUDE 10°    LATITUDE 40°

AIRCRAFT 2    EAST LONGITUDE 11°    LATITUDE 40°

DISPLAY EXAMPLE: AIRPORT INFORMATION DISPLAY

FIG. 13

AUTOMATIC AIRPORT INFORMATION TRANSMITTING APPARATUS

CROSS REFERENCE TO RELATED APPLICATION

This is a continuation of International Application PCT/JP99/01488, with an international filing date of Mar. 24, 1999.

TECHNICAL FIELD

The present invention is related to an automatic airport information transmitting apparatus for automatically transmitting information required for landings to aircraft that fly around a relatively small-scaled airport where a controller is not present in order to achieve safety flights of these aircraft.

TECHNICAL BACKGROUND

FIG. 14 is a block diagram for showing the function of "EVALUATION EXPERIMENT OF AIRPORT SURFACE SURVEILLANCE AND DISPLAY SYSTEM" described in the abstract of the research lecture No. 27 held by the ELECTRONIC NAVIGATION RESERCH INSTITUTE of the Japanese Transport Ministry, pages 41 to 44, in 1995.

In FIG. 14, reference numeral 1 shows a radar antenna of an ASDE (Airport Surface Detection Equipment), reference numeral 2 indicates a transmitter for transmitting electromagnetic waves, and reference numeral 3 shows a receiver for receiving electromagnetic waves reflected from a target such as an aircraft, while the transmitter 2 transmits the electromagnetic waves. An airport surface detection equipment radar apparatus is constituted by employing the radar antenna 1, the transmitter 2, and the receiver 3. The airport surface detection equipment radar apparatus transmits electromagnetic waves to insides of an airport, and detects an airport surface by receiving radar signals reflected from a target such as an aircraft and then by overwriting the received radar signals on map information of the airport surface.

Also, reference numeral 4 denotes an ASDE target detecting apparatus for detecting a target position from the radar signal. Reference numeral 5 represents a trace processing apparatus for discriminating an aircraft by identifying a position of an aircraft and a discrimination code thereof as detected by the ASDE target detecting apparatus 4 and an ASR/SSR target detecting apparatus (will be discussed later) 8, and a flight-number code of the aircraft as received by an FDP (will be explained later) 9, and for outputting both the position and the flight-number of the discriminated aircraft. Reference numeral 6 shows an evaluation display apparatus for displaying aircraft positional information to which the discrimination code by the trace processing apparatus 5 are added.

Furthermore, reference numeral 7 shows an airport surveillance radar(ASR)/secondary airport surveillance radar (SSR) apparatus (will be referred to as an "ASR/SSR" hereinafter), reference numeral 8 represents an ASR/SSR target detecting apparatus for detecting a target position (aircraft position) and a discrimination code of an aircraft from the radar signal of the ASR/CSR 7. Also, reference numeral 9 indicates a flight data processing system (will be referred to as an "FDP" hereinafter) on which a flight-number of an aircraft is described. It should be noted that reference numeral 13 indicates a waveguide selector.

Next, a description will now be made of operations.

The electromagnetic waves which are transmitted from the transmitter 2 via the radar antenna 1 to the inside of the airport are reflected from a target such as the aircraft, and then the reflected electromagnetic waves are received by the receiver 3 in the form of a radar signal. After reception, as to the radar signal received by the receiver 3, the ASDE target detecting apparatus 4 detects the amplitude of this radar signal, and calculates a position of an aircraft, while using such an amplitude of the radar signal, which is larger than a predetermined value, as an electromagnetic reflection from the aircraft.

Also, an aircraft which is flying around the airport reflects the electromagnetic waves emitted from the ASR/SSR 7, these electromagnetic waves are reflected as the radar signal. The ASR/SSR target detecting apparatus 8 detects the position of the aircraft by detecting as to whether or not the amplitude of this radar signal is large. Also, the beacon code of the aircraft is converted into the corresponding data by the interrogation signal sent from the SSR.

The trace processing apparatus 5 discriminates the aircraft by identifying the position of the aircraft and the discrimination code thereof to the flight-number code of the aircraft, and then displays both the position and the flight-number of the discriminated aircraft on the evaluation display apparatus 6. The first-mentioned position of the aircraft is detected by the ASDE target detecting apparatus 4. The discrimination code of the aircraft is detected by the ASR/SSR target detecting apparatus 8. The flight-number code of the aircraft is received by the FDP 9.

Since the conventional automatic airport surface aircraft discriminative display system is arranged by employing the above-explained arrangement, in a relatively large-scaled airport, or a relatively medium-scaled airport where a controller is present, the controller surveilles the positions of the aircraft, and communicates with the pilots of these aircraft via the mutual speech (voice) communications so as to execute the flight controls.

However, in a small-scaled airport where no controller is present, as to an aircraft which will land on this airport, after a pilot of this aircraft has made a visual confirmation of a condition within the airport, this aircraft should land at this airport. The pilot could not confirm the conditions of the airport, for example, the landing attitudes and the airport under taxing condition until this aircraft has approached the air zone in the vicinity of this airport. In particular, the aircraft could not land on the airport under such weather conditions as heavy rains and strong winds, and furthermore, there is a risk when the aircraft lands at this airport under such weather conditions.

The present invention has been made to solve the above-explained problems, and therefore, has an object to provide an automatic airport information transmitting apparatus for automatically transmitting such information required for landing operation to an aircraft flying in an air zone around an airport in order that a safety flight of this aircraft can be improved.

DISCLOSURE OF THE INVENTION

An automatic airport information transmitting apparatus, according to the present invention, is featured by comprising: airport-inside-target detecting means for detecting a target inside an airport; target judging means for judging a target moved in a place within the airport, which is required to surveille an aircraft based upon target position information derived from the airport-inside-target detecting means; and transmitting means for transmitting information of the target inside the airport judged by the target judging means to an aircraft which is flying around the airport in a wireless manner.

The automatic airport information transmitting apparatus is featured by further comprising: weather monitoring means for monitoring a weather condition around the airport; wherein: the transmitting means adds the weather information monitored by the weather monitoring means to the target information of the airport, and then transmits the resulting target information to the aircraft which is flying around the airport in the wireless manner.

The automatic airport information transmitting apparatus is featured by further comprising: an airport surveillance radar apparatus installed within the airport, for emitting electromagnetic waves to the peripheral area of the airport and for receiving radar signals reflected from the targets to thereby surveille the peripheral area of the airport; and approaching target detecting means for detecting that a target existing in the peripheral area of the airport has approached a predetermined area within the peripheral area of the airport in response to a reception signal from the airport surveillance radar apparatus; wherein: at least one of the airport-inside-target detecting means, the target judging means, and the transmitting means commences its operation only when the detection signal derived from the approaching target detecting means is inputted thereinto.

The automatic airport information transmitting apparatus is featured by further comprising: an airport surveillance radar apparatus installed within the airport, for emitting electromagnetic waves to the peripheral area of the airport and for receiving radar signals reflected from the targets to thereby surveille the peripheral area of the airport; approaching target detecting means for detecting that a target existing in the peripheral area of the airport has approached a predetermined area within the peripheral area of the airport in response to a reception signal from the airport surveillance radar apparatus; and position judging means for judging a mutual positional relationship in the case that a plurality of targets are detected by the approaching target detecting means; wherein: the transmitting means transmits positional information of other aircraft under flight to an aircraft under flight based upon the mutual positional relationship among the plurality of targets derived from the position judging means in the wireless manner.

The airport-inside-target detecting means includes: an airport surface detection equipment radar apparatus for detecting an airport surface in response to a radar signal which is received by emitting electromagnetic waves to the inside of the airport and by reflecting the electromagnetic waves from the target; and a target detecting apparatus for detecting a position of the target in response to the output signal from the airport surface detection equipment radar apparatus to output target position information.

The airport-inside-target detecting means includes: an industrial monitoring camera for monitoring the inside of the airport; and an image processing apparatus for processing an image acquired by the industrial monitoring camera by way of a pattern recognition manner to thereby detect the target.

The airport-inside-target detecting means includes: an infrared monitoring camera for monitoring the inside of the airport; and an image processing apparatus for processing an image acquired by the infrared monitoring camera by way of a pattern recognition manner to thereby detect the target.

The airport-inside-target detecting means includes: a noise monitoring microphone for monitoring the inside of the airport; and a speech target detecting apparatus for detecting a target in response to a noise level collected by the noise monitoring microphone.

The transmitting means is provided with: speech broadcasting means for transmitting transmission information by way of a speech broadcasting manner.

The transmitting means is provided with: message transmitting means for forming transmission information as a message of text information to thereby transmit the text information message.

BRIEF DESCRIPTION OF THE DRAWINGS

FIG. 13 is an explanatory diagram for representing an example of displaying a message related to positions of other flying aircraft.

BEST MODE FOR CARRYING OUT THE INVENTION

Embodiment Mode 1

Figure 1:
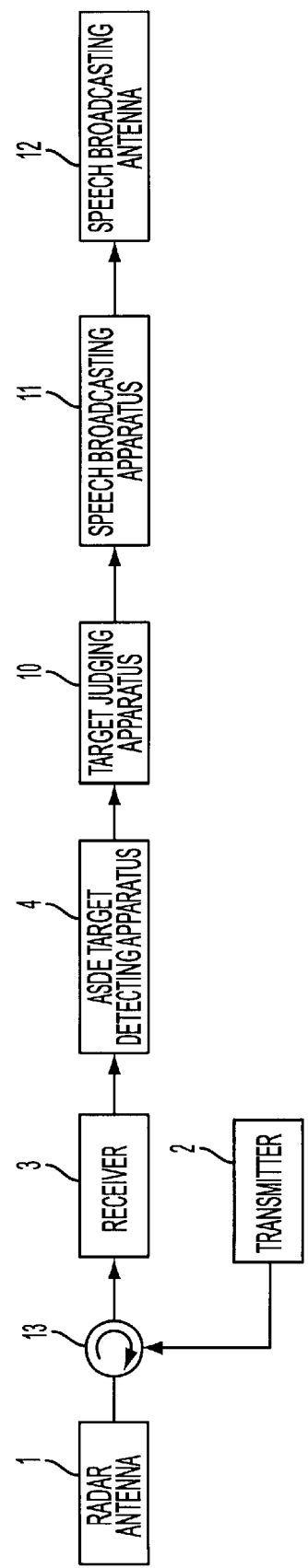
FIG. 1 is a block diagram for showing an arrangement of an automatic airport information transmitting apparatus according to an embodiment mode 1 of the present invention.

FIG. 1 is a block diagram for indicating an arrangement of an automatic airport information transmitting apparatus according to an embodiment mode 1 of the present invention.

In FIG. 1, reference numeral 1 shows a radar antenna of an ASDE (Airport Surface Detection Equipment), reference numeral 2 indicates a transmitter for transmitting electromagnetic waves, and reference numeral 3 shows a receiver for receiving electromagnetic waves reflected from a target such as an aircraft, while the transmitter 2 transmits the electromagnetic waves.

An airport surface detection equipment radar apparatus is constituted by employing the radar antenna 1, the transmitter 2, and the receiver 3. The airport surface detection equipment radar apparatus transmits electromagnetic waves to insides of an airport, and detects an airport surface by receiving radar signals reflected from a target such as an aircraft and then by overwriting the received radar signals on map information of the airport surface. It should be noted that reference numeral 13 indicates a circulator.

Also, reference numeral 4 denotes an ASDE target detecting apparatus for detecting a target position from the radar signal of the above-described receiver 3. This ASDE target detecting apparatus may function as an airport-inside-target detecting means for detecting a target existing within the airport in conjunction with the arrangement of the above-explained airport surface detection equipment radar apparatus. Also, as new reference numerals, reference numeral 10 shows a target judging apparatus for judging a target which is moved at a place such as a landing strip (runway) and a guiding path within an airport, which is required to control an aircraft, based upon the target information described from the ASDE target detecting apparatus 4. Reference numeral 11 shows a speech broadcasting apparatus for automatically radio-transmitting the target within the airport, which is judged by the target judging apparatus 10, to an aircraft flying around the airport. Also, reference numeral 12 represents a speech broadcasting antenna. This speech broadcasting antenna 12 constitutes a transmitting means for radio-transmitting the target information within the airport to the aircraft flying around the airport in conjunction with the speech broadcasting apparatus 11.

Next, a description will now be made of operations related to the above-explained arrangement.

The electromagnetic waves which are transmitted from the transmitter 2 via the radar antenna 1 to the inside of the airport are reflected from a target such as the aircraft, and then the reflected electromagnetic waves are received by the receiver 3 in the form of a radar signal. After reception, as to the radar signal received by the receiver 3, the ASDE target detecting apparatus 4 detects the amplitude of this radar signal, and calculates a position of an aircraft, while using such an amplitude of the radar signal, which is larger than a predetermined value, as an electromagnetic reflection from the target such as the aircraft.

The target judging apparatus 10 calculates a moving speeds (moving velocity) of the target such as the aircraft detected by the ASDE target detecting apparatus 4 based upon a difference between a position scanned at present and a position scanned before 1 scanning period. Also, the target judging apparatus 10 calculates a dimension of an aircraft from a broadness of a peak of an amplitude of a radar signal, so that an error target such as a clutter can be suppressed. The detected target is speech-synthesized by the speech broadcasting apparatus 11, and then, the speech-synthesized target signal is transmitted from the speech broadcasting antenna 12 via the aerial radio frequency band (air frequency band).

Figure 9:
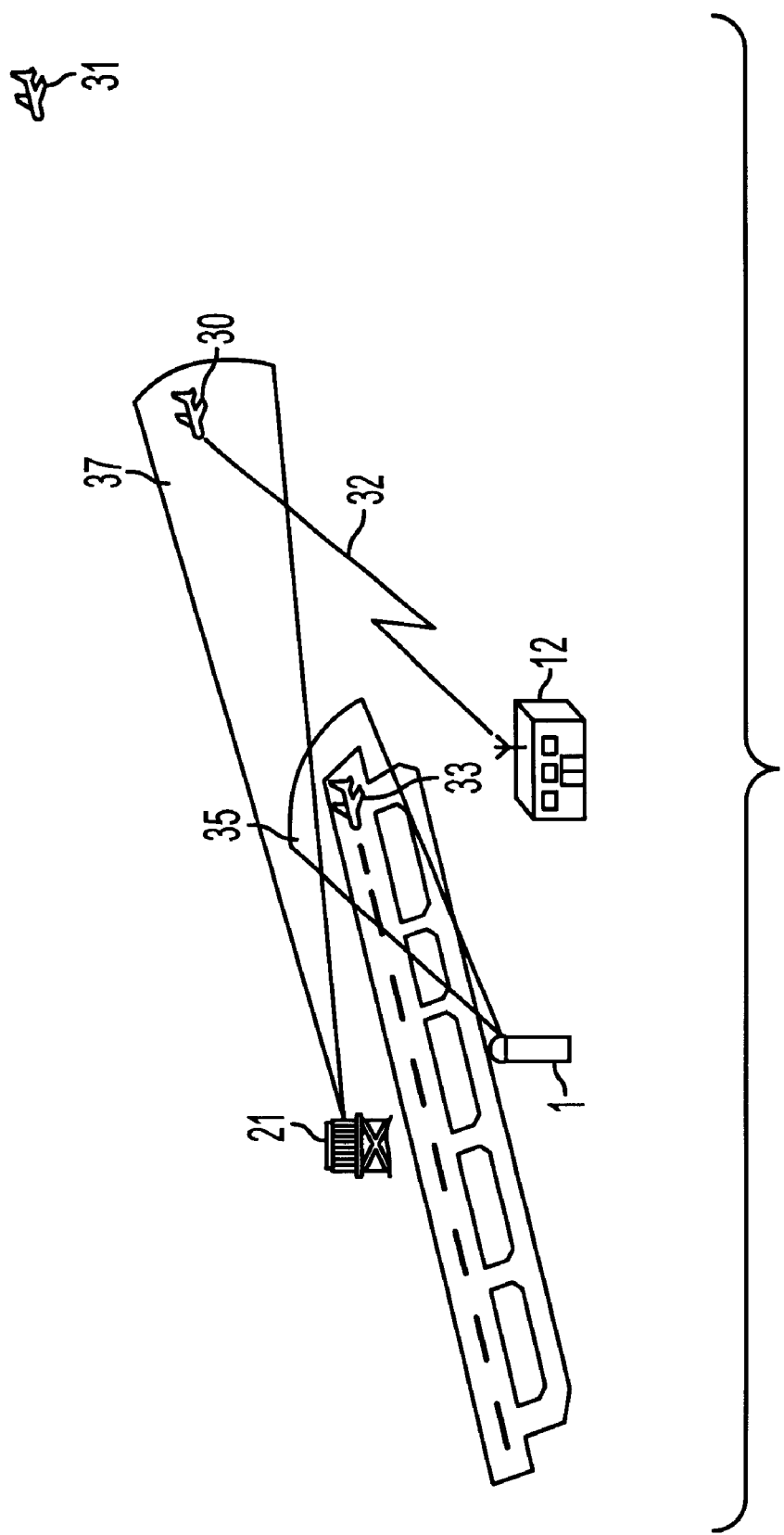
FIG. 9 is an explanatory diagram for representing a relative relationship between an airport and aircraft flying in a peripheral air zone of this airport.

Referring now to FIG. 9, a basic operation idea will be described.

FIG. 9 is an illustration for representing a relative relationship between an airport and aircraft which are flying in a peripheral air zone of this airport. ASDE electromagnetic waves 35 transmitted from the radar antenna (ASDE antenna) 1 are reflected from, for example, a departing aircraft 33 which is present on a landing strip within the airport, and then, the reflected ASDE electromagnetic waves are detected by the ASDE target detecting apparatus 4. A position of this departing aircraft is detected, and both a moving speed and an approximated dimension thereof are detected by the target judging apparatus 10.

The information related to the position, speed, and approximated dimension of the aircraft, which are judged by the target judging apparatus 10, is converted into artificial speech by the speech broadcasting apparatus 11. Then, the converted artificial speech is transmitted via the speech broadcasting antenna 12 as speech data 32 to, for example, an aircraft radio apparatus (wireless apparatus) of a landing aircraft 30 which is flying in the peripheral air zone of this airport and is now under landing attitude.

As the speech data 32, information related to a position, a speed, and an approximated dimension of an aircraft existing in an airport is automatically transmitted, which may notify as to whether or not such an aircraft which may impede a landing operation is present within an airport, even when another aircraft has approached the airport. As the speech broadcasting, for instance, expressions such as "aircraft 1, landing strip No. 27, speed of 10 knots, dimension: large" may be made.

As previously described, since the aircraft are automatically detected by the ASDE and the positions/moving speeds/approximated dimensions of the aircraft within the airport are transmitted to the pilot of the aircraft under flight by way of the wireless manner, the traffic condition of the landing airport can be confirmed by the specific manner other than the visual confirming manner, which can contribute an improvement in the safety operations of the aircraft.

Embodiment Mode 2

Figure 2:
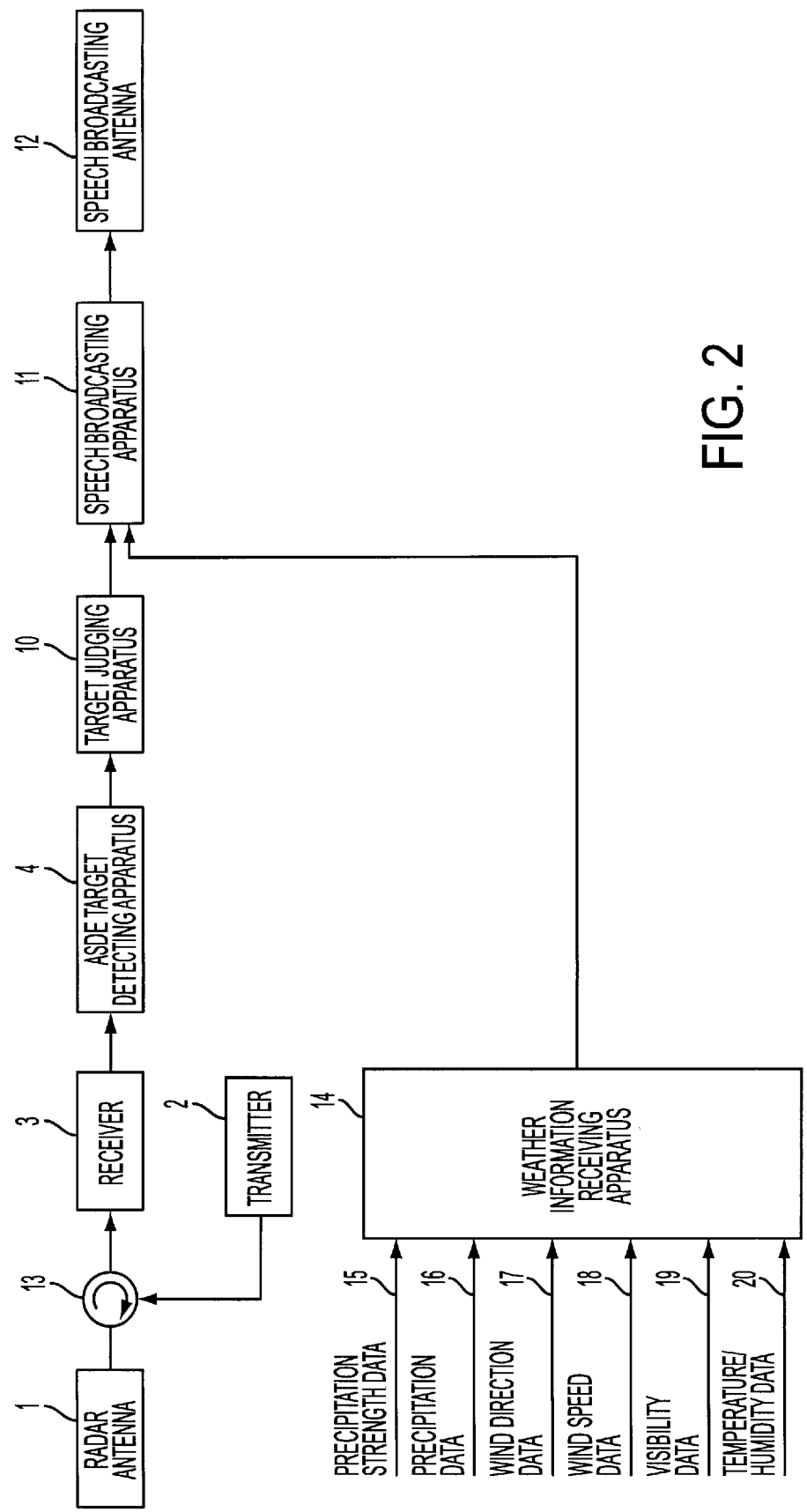
FIG. 2 is a block diagram for showing an arrangement of an automatic airport information transmitting apparatus according to an embodiment mode 2 of the present invention.

FIG. 2 is a block diagram for showing an arrangement of an automatic airport information transmitting apparatus according to an embodiment mode 2 of the present invention.

It should be noted that the same reference numerals shown in FIG. 1 will be employed as those for indicating the same, or similar elements represented in FIG. 2, and therefore, descriptions thereof are omitted. As new reference numerals, reference numeral 14 indicates a weather information receiving apparatus functioning as a weather monitoring means for monitoring weather conditions around an airport. The speech broadcasting apparatus 11 adds the weather information derived from the weather information receiving apparatus 14 to target information within the airport, and then broadcasts the weather information added with the target information to an aircraft flying around the airport by way of the radio speech transmission manner.

In other words, only the position, speed, approximated dimension of the aircraft within the airport are automatically transmitted by the speech synthesizing manner in the above-explained embodiment mode 1. In this embodiment mode 2, since the weather information around the airport is added to the above-explained information, the detailed condition of the airport at which the aircraft will land can be grasped.

As the weather information, various data measured by weather data measuring devices installed in the airport are acquired in a batch mode by the weather information receiving apparatus 14. These weather data are precipitation (rainfall) strength data 15, precipitation data 16, wind direction data 17, wind speed data 18, visibility data 19, and temperature/humidity data 20. This weather information is added to the information related to the position/speed/ approximated dimension of the aircraft which is detected based upon the basic idea shown in the embodiment mode 1. The resultant data is converted into artificial speech in the speech broadcasting apparatus 11, and then the speech synthesized data is transmitted by the speech broadcasting antenna 12 via the aerial radio frequency band.

As the speech broadcasting, for instance, expressions such as "aircraft 1, landing strip No. 27, speed of 10 knots, dimension: large, precipitation strength of 16 mm/h, precipitation of 20 mm, wind direction is south-southeast, wind direction of 3 knots, visibility of 2 miles, temperature of 25° C., 60% of humidity" may be made.

As previously described, since the aircraft are automatically detected by the ASDE, and also the positions/moving speed/approximated dimensions of the aircraft within the airport, the precipitation, the precipitation strength, the wind speed, the wind direction, the visibility, the temperature, and the humidity are transmitted to the pilot of the flying aircraft by way of the speech communication through electromagnetic waves, the traffic condition of the landing airport can be confirmed by the specific manner other than the visual confirming manner, which can contribute an improvement in the safety operations of the aircraft.

Embodiment Mode 3

Figure 3:
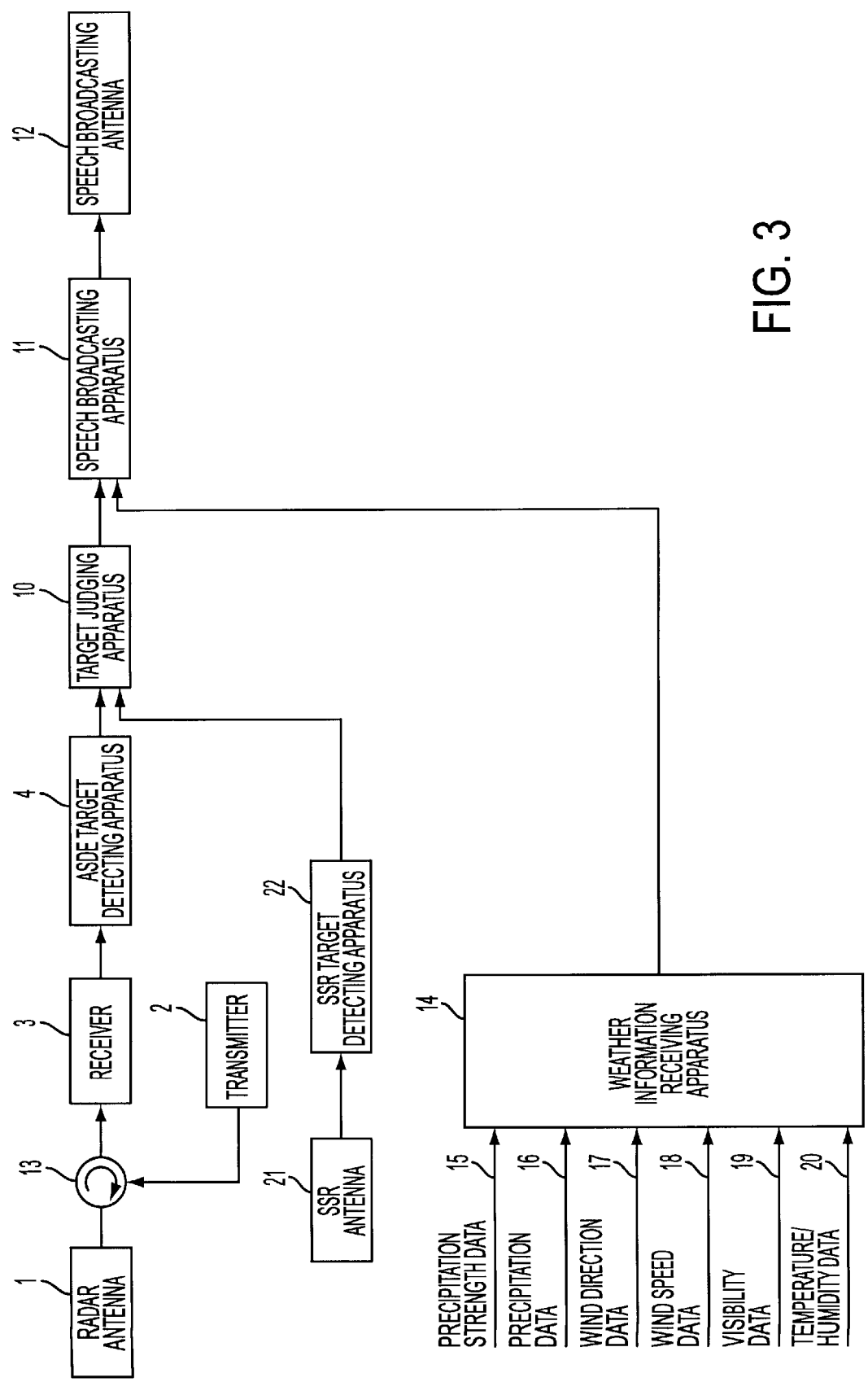
FIG. 3 is a block diagram for showing an arrangement of an automatic airport information transmitting apparatus according to an embodiment mode 3 of the present invention.

FIG. 3 is a block diagram for showing an arrangement of an automatic airport information transmitting apparatus according to an embodiment mode 3 of the present invention.

It should be noted that the same reference numerals shown in FIG. 2 will be employed as those for indicating the same, or similar elements represented in FIG. 3, and therefore, descriptions thereof are omitted. As new reference numerals, reference numeral 21 denotes an SSR antenna of a secondary surveillance radar (will be simply referred to as an "SSR" hereinafter). This SSR apparatus is installed in an airport, transmits electromagnetic waves to peripheral areas of the airport, and receives radar signals reflected from targets so as to monitor the peripheral areas of this airport. Reference numeral 22 represents an SSR target detecting apparatus for detecting an approaching target. This SSR target detecting apparatus judges a position of a target flying around the airport based upon the reception signal of the SSR antenna 21, and detects that the target flying around the airport has approached a predetermined area located around the airport. Only in such a case that a landing aircraft is present, the target judging apparatus 10 for receiving this detection signal of the SSR target detecting apparatus 22 may commence the operation of the speech broadcasting apparatus 11 which automatically transmits the above-described speech broadcasting data.

In other words, in accordance with the above-explained embodiment mode 2, the respective weather information is regularly transmitted by way of the speech synthesizing manner irrespective of such a fact as to whether or not there is a flying aircraft under landing attitude. As the weather information, there are the position/speed/approximated dimension of another aircraft within the airport, the precipitation strength data 15, the precipitation data 16, the wind direction data 17, the wind speed data 18, the visibility data 19, and the temperature/humidity data 20. To the contrary, in this embodiment mode 3, in the case that there is no such an aircraft flying around the airport, the information of the aircraft within the airport is not always surveilled, but may be transmitted when required.

As a result, while the SSR antenna 21 is installed and the aircraft flying in this vicinity of the airport is detected by the SSR target detecting apparatus 22, the speech broadcasting apparatus 11 may be actuated only when there is the aircraft within the range where the speech broadcasting is required.

It should be noted that in this embodiment mode 3, the operation of the speed broadcasting apparatus 11 is commenced only when there is such an aircraft flying in the vicinity of the airport. Alternatively, the radar antenna 1, the transmitter 2, the receiver 3, the ASDE target detecting apparatus 4, the target judging apparatus 10, and the weather information receiving apparatus 14 may be similarly operated only when there is an aircraft flying in the vicinity of the airport. As a result, the operation time of the respective airport facilities may be furthermore reduced, and also the security aspect related to the flights of aircraft can be maintained.

Referring now to FIG. 9, a basic operation idea will be described.

As shown in FIG. 9, the SSR antenna 21 emits SSR electromagnetic waves 37 into space, and receives SSR radar signals which are reflected and issued from a response of an aircraft 30 under flight. The SSR target detecting apparatus 22 discriminates, or identifies both a position of the aircraft 30 under flight and a beacon code.

The position of the aircraft 30 under flight is calculated in such a manner that the SSR target detecting apparatus 22, based upon the radar signal received by the SSR antenna 21, detects that the amplitude of the radar signal exceeds a defined amplitude. Furthermore, the SSR target detecting apparatus 22 judges that this aircraft has approached a predetermined area in the vicinity of the airport, for example, this aircraft has passed through a predetermined point of a flight path which is defined with respect to each of airports. In other words, the SSR target detecting apparatus 22 judges that this aircraft has entered into, for example, a range of a radius of 20 Km from the airport. Only when this aircraft flies within this predetermined point of the flight path, the speech broadcasting apparatus 11 is operated by the target judging apparatus 10 which receives this judging signal. As a consequence, the target information within the airport, which is constituted by the position/speed/approximated dimension of the aircraft flying within the airport, is speech-synthesized with the weather information which is constituted by the precipitation strength data, the precipitation data, the wind direction data, the wind speed data, the visibility data, and the temperature/humidity data. Then, the speech-synthesized data can be automatically transmitted under only necessary conditions.

As previously described, since the aircraft are automatically detected by the ASDE, and also the positions/moving speeds/approximated dimensions of the aircraft within the airport, the precipitation, the precipitation strength, the wind speed, the wind direction, the visibility, the temperature, and the humidity are transmitted to the pilot of the aircraft under flight by way of the speech communication through electromagnetic waves, the traffic condition of the landing airport can be confirmed by the specific manner other than the visual confirming manner, which can contribute an improvement in the safety operations of the aircraft. Also, only in such a case that the position of the aircraft under flight has approached a predetermined area of the airport, the respective airport facilities are operated. As a result, the operation time of the respective airport facilities can be reduced, and also the security aspect related to the flights of aircraft can be maintained.

Embodiment Mode 4

Figure 4:
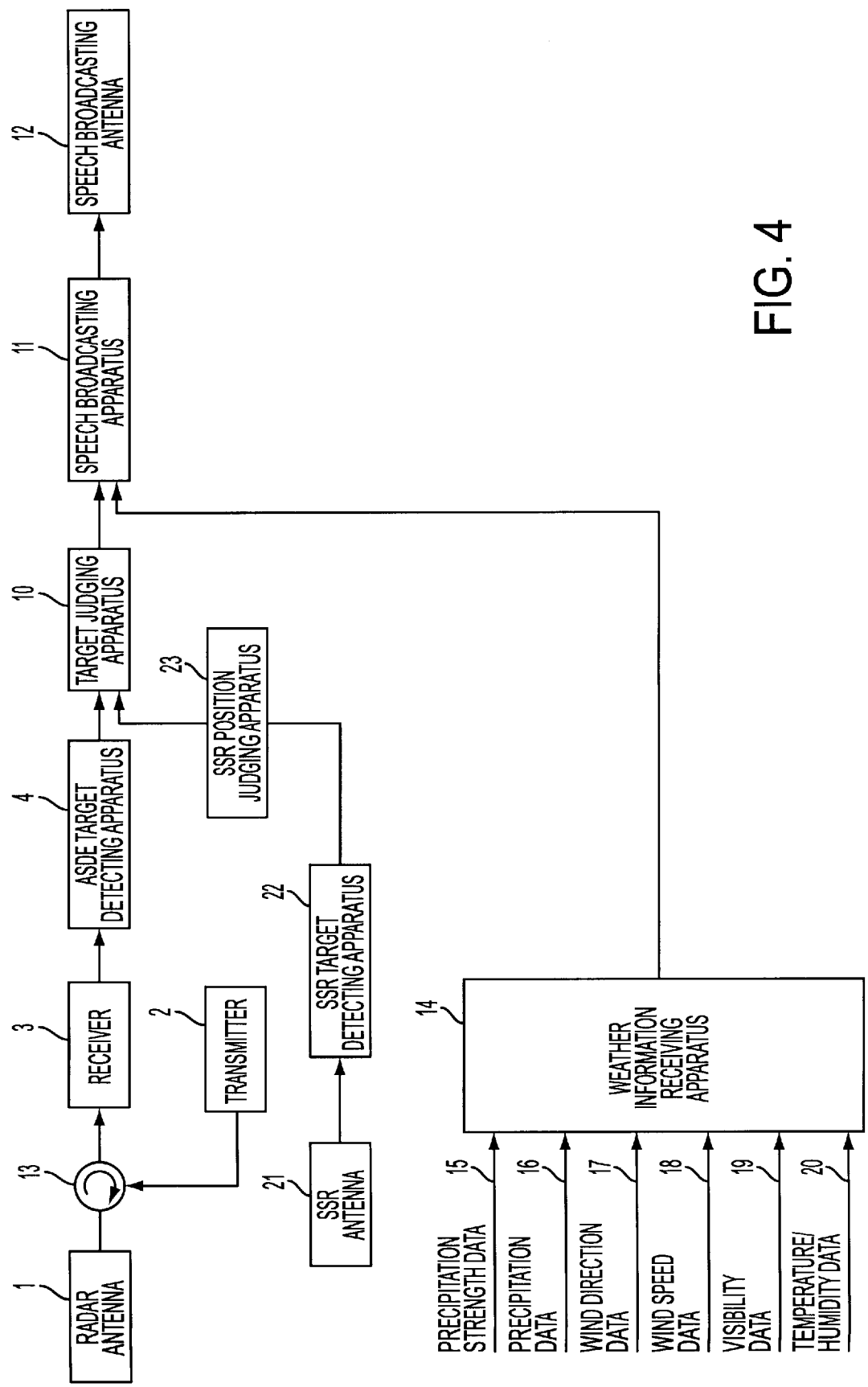
FIG. 4 is a block diagram for showing an arrangement of an automatic airport information transmitting apparatus according to an embodiment mode 4 of the present invention.

FIG. 4 is a block diagram for showing an arrangement of an automatic airport information transmitting apparatus according to an embodiment mode 4 of the present invention.

It should be noted that the same reference numerals shown in FIG. 3 will be employed as those for indicating the same, or similar elements represented in FIG. 4, and therefore, descriptions thereof are omitted. As new reference numerals, reference numeral 23 shows an SSR position judging apparatus. In such a case that the SSR target detecting apparatus 22 detects that there are plural aircraft which have approached a predetermined area in the vicinity of the airport, the SSR position judging apparatus 23 judges a positional relation among the plurality of aircraft and then transmits positional information about other aircraft to an aircraft under flight via the target judging apparatus 10 by the speech broadcasting apparatus 11 and the speech broadcasting antenna 12.

In other words, in accordance with the above-explained embodiment mode 3, the respective weather data is automatically transmitted by way of the speech synthesizing manner only in such a case that there is such an aircraft at the predetermined position in the vicinity of the airport. As the weather data, there are the position/speed/approximated dimension of another aircraft within the airport, the precipitation strength data, the precipitation data, the wind direction data, the wind speed data, the visibility data, and the temperature/humidity data. To the contrary, in this embodiment mode 4, in the case that there are a plurality of aircraft flying around the airport, the SSR position judging apparatus 23 judges a positional relationship among mutual aircraft based upon both the positional information of the aircraft and the beacon codes, which are detected by the SSR target detecting apparatus 22 based on the radar signal acquired by the SSR antenna 21. Since the positional information of the aircraft under flight is added to the speech broadcasting data shown in the embodiment mode 3, the pilot of the aircraft under flight can grasp the positions of other aircraft flying in the vicinity of the airport without receiving an instruction of a controller of this airport.

As the speech broadcasting, for instance, expressions such as "aircraft 1, landing strip No. 27, speed of 10 knots, dimension: large, precipitation strength of 16 mm/h, precipitation of 20 mm, wind direction is south-southeast, wind direction of 3 knots, visibility of 2 miles, temperature of 25° C., 60% of humidity, aircraft 2 directed by 28° from airport, direction of 5 miles, speed of 80 knots, dimension: small, - - - " may be made.

Next, a basic operation idea will now be explained with reference to FIG. 9.

In the case that no report is made from a controller of an airport, both a pilot of a landing aircraft 30 and another pilot of another landing aircraft 31, which are flying around the airport cannot grasp a positional relationship with each other, but may judge the positional relationship visually. To the contrary, in accordance with this embodiment mode 4, the positional information of other aircraft is transmitted via the air radio frequency band by both the speech synthesizing apparatus 11 and the speech broadcasting antenna 12 in response to the reception signal by the SSR antenna 21 used to surveille the air zone around the airport. As a result, even when no contact is made with the flight controller, the pilots of the respective aircraft can grasp the presence of other aircraft even over such a longer distance than the visible distances of these pilots.

As previously described, since the aircraft are automatically detected by the ASDE, and also the positions/moving speeds/approximated dimensions of the aircraft within the airport, the precipitation, the precipitation strength, the wind speed, the wind direction, the visibility, the temperature, and the humidity are transmitted to the pilot of the aircraft under flight by way of the speech communication through electromagnetic waves, the traffic condition of the landing airport can be confirmed by the specific manner other than the visual confirming manner. Also, since the positions of a plurality of aircraft under flight can be grasped, the system of this embodiment mode 4 can contribute an improvement in the safety operations of the aircraft existing in the air zone around the airport and in this airport.

Embodiment Mode 5

Figure 5:
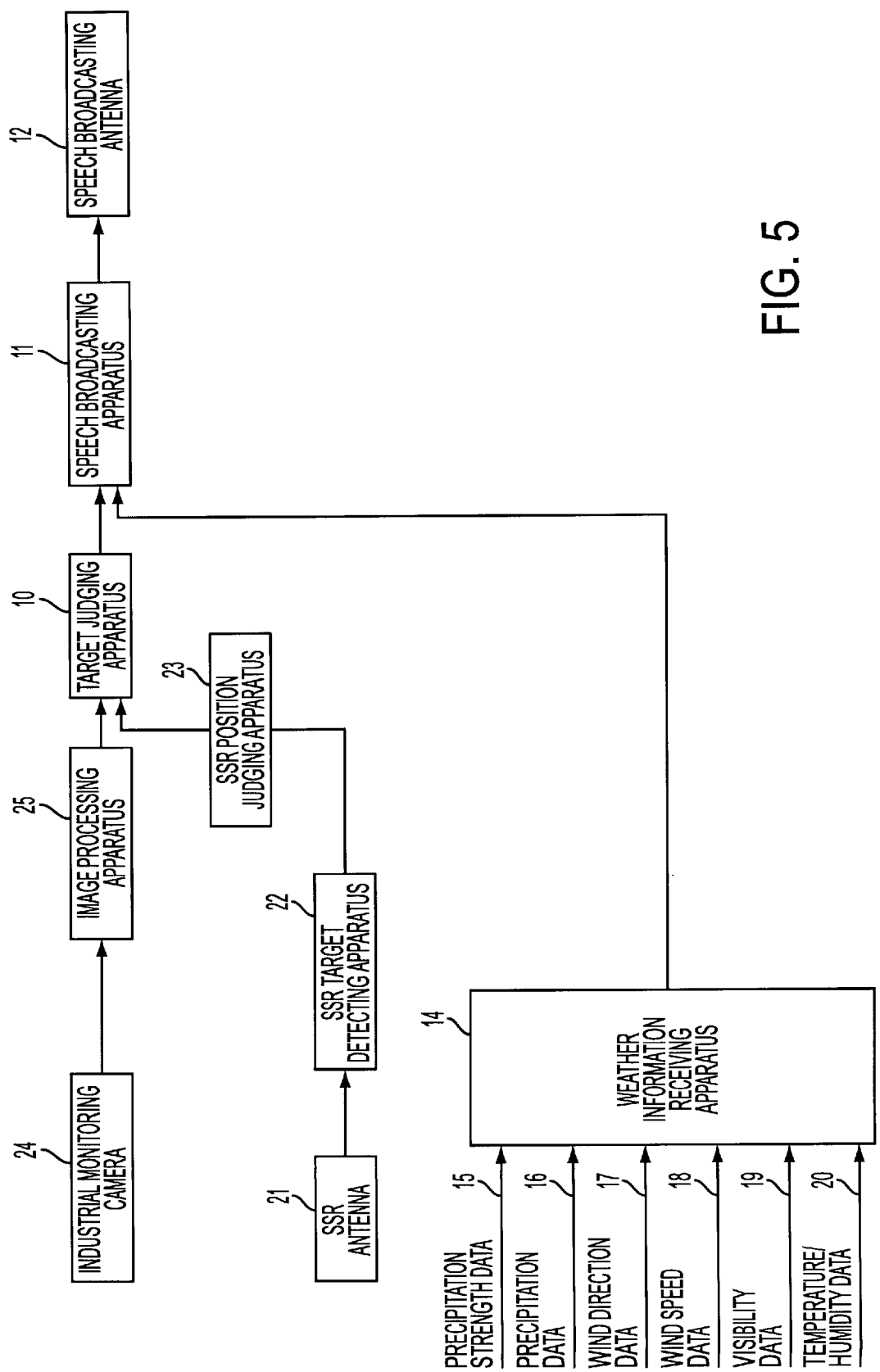
FIG. 5 is a block diagram for showing an arrangement of an automatic airport information transmitting apparatus according to an embodiment mode 5 of the present invention.

FIG. 5 is a block diagram for showing an arrangement of an automatic airport information transmitting apparatus according to an embodiment mode 5 of the present invention.

It should be noted that the same reference numerals shown in FIG. 4 will be employed as those for indicating the same, or similar elements represented in FIG. 5, and therefore, descriptions thereof are omitted. As new reference numerals, reference numeral 24 indicates an industrial monitoring camera for monitoring an inside of an airport, and reference numeral 25 shows an image processing apparatus for processing an image acquired by the industrial monitoring camera 24 by way of a pattern recognition so as to detect a target.

In the above-described embodiment mode 3, the ASDE is employed as the means for detecting the positions/speeds/approximated dimensions of other aircraft existing in the airport. In this embodiment mode 5, while the industrial monitoring camera 24 is used instead of this ASDE, the image signal acquired by the industrial monitoring camera 24 is processed by way of the pattern recognition by the image processing apparatus 25, so that a position, a speed, and an approximated dimension of an aircraft can be recognized, and also the cost of the apparatus can be reduced, as compared with that of using such an ASDE.

Next, a basic operation idea will now be explained with reference to FIG. 10 and FIG. 11.

Figure 10:
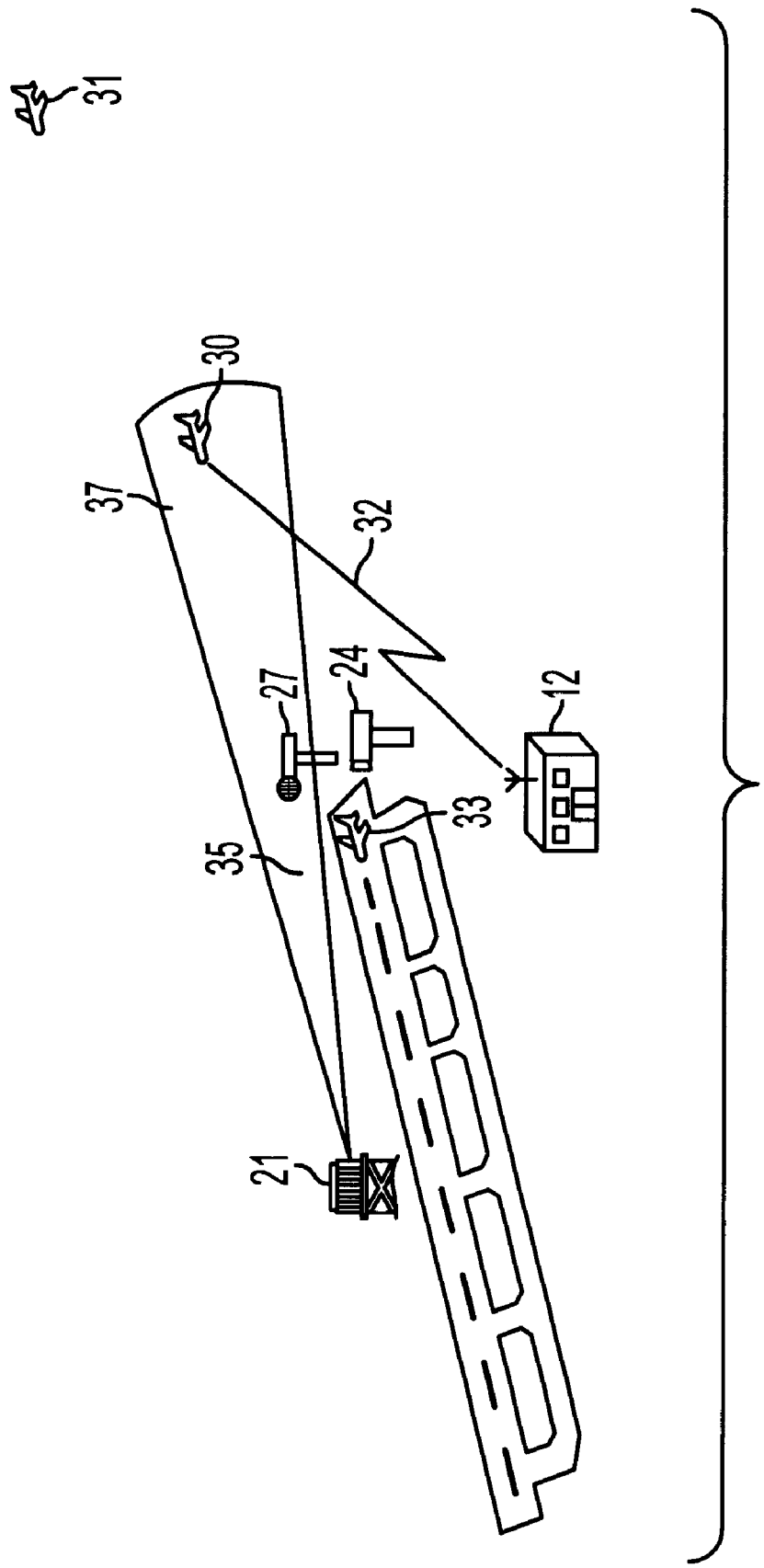
FIG. 10 is an explanatory diagram for explaining an example of an airport where an industrial monitoring camera is installed instead of an ASDE.
Figure 11:
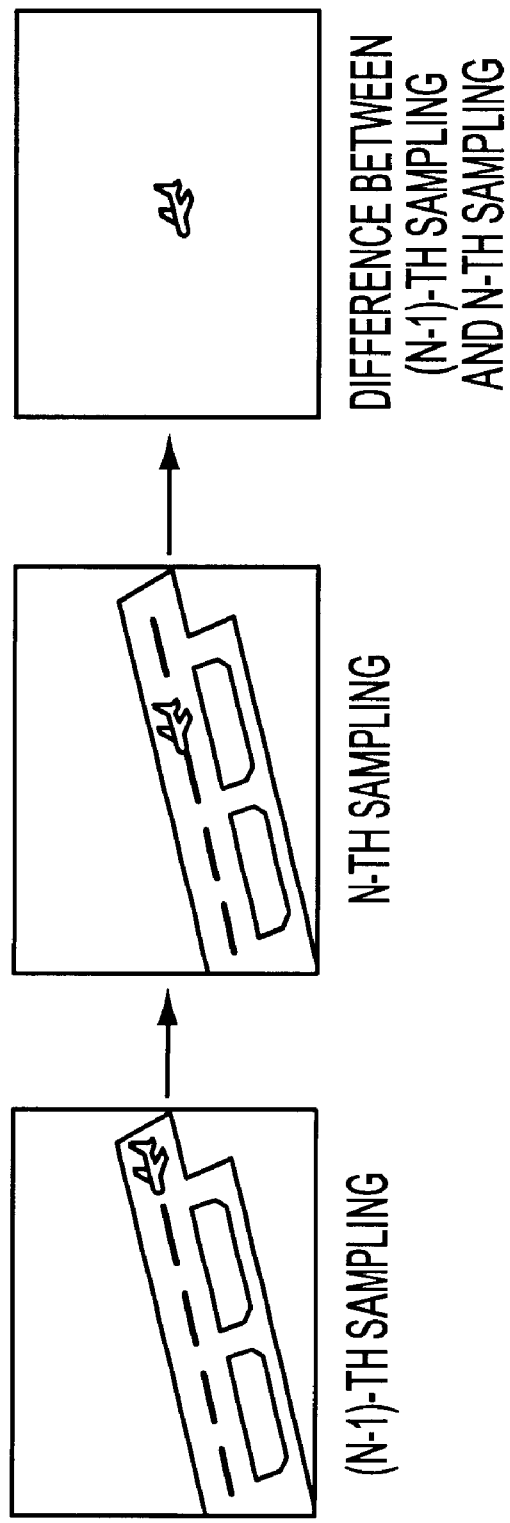
FIG. 11 is an explanatory diagram for explaining a pattern recognition process operation by an image processing apparatus for processing a picture imaged by an industrial monitoring camera.

FIG. 10 is an operation diagram in which the industrial monitoring camera 24 is set within the airport instead of the ASDE radar apparatus (radar antenna 1) shown in FIG. 1. It should be noted that only one set of such an industrial monitoring camera 24 is installed in this operation diagram of FIG. 10. Alternatively, plural sets of industrial monitoring cameras 24 may be installed in order to monitor an important area within a landing strip, a guide path, a spot, and so on. Also, FIG. 11 represents a process operation in which an image taken by the industrial monitoring camera 24 is processed by way of the pattern recognition by the image processing apparatus 25. In this drawing since a calculation is made of a difference between an image inputted at an (n-1)-th time instant and another image inputted at an n-th time instant, an aircraft corresponding to a moving object is extracted and a position of this aircraft is calculated. Also, a speed of an aircraft is calculated based on a moving difference distance of this aircraft, and also a dimension of this aircraft is calculated based upon a total number of pixels.

With employment of this method, the position/speed/ approximated dimension of the target such as the aircraft can be calculated.

As previously explained, while the low-cost industrial monitoring camera is used instead of the ASDE radar apparatus, the aircraft is automatically detected by executing the image processing operation by the pattern recognition. Further, because the positions/moving speeds/approximated dimensions of aircraft within the airport, the precipitation, the precipitation strength, the wind speed, the wind direction, the visibility, the temperature, and the humidity are transmitted to the pilot of the aircraft under flight by way of the speech communication through electromagnetic waves, the traffic condition of the landing airport can be confirmed by the specific manner other than the visual confirming manner. Also since the positions of the plural aircraft under flight can be grasped, the system of this embodiment mode 5 can contribute an improvement in the safety operations of the aircraft existing in the air zone around the airport and also within this airport.

Embodiment Mode 6

Figure 6:
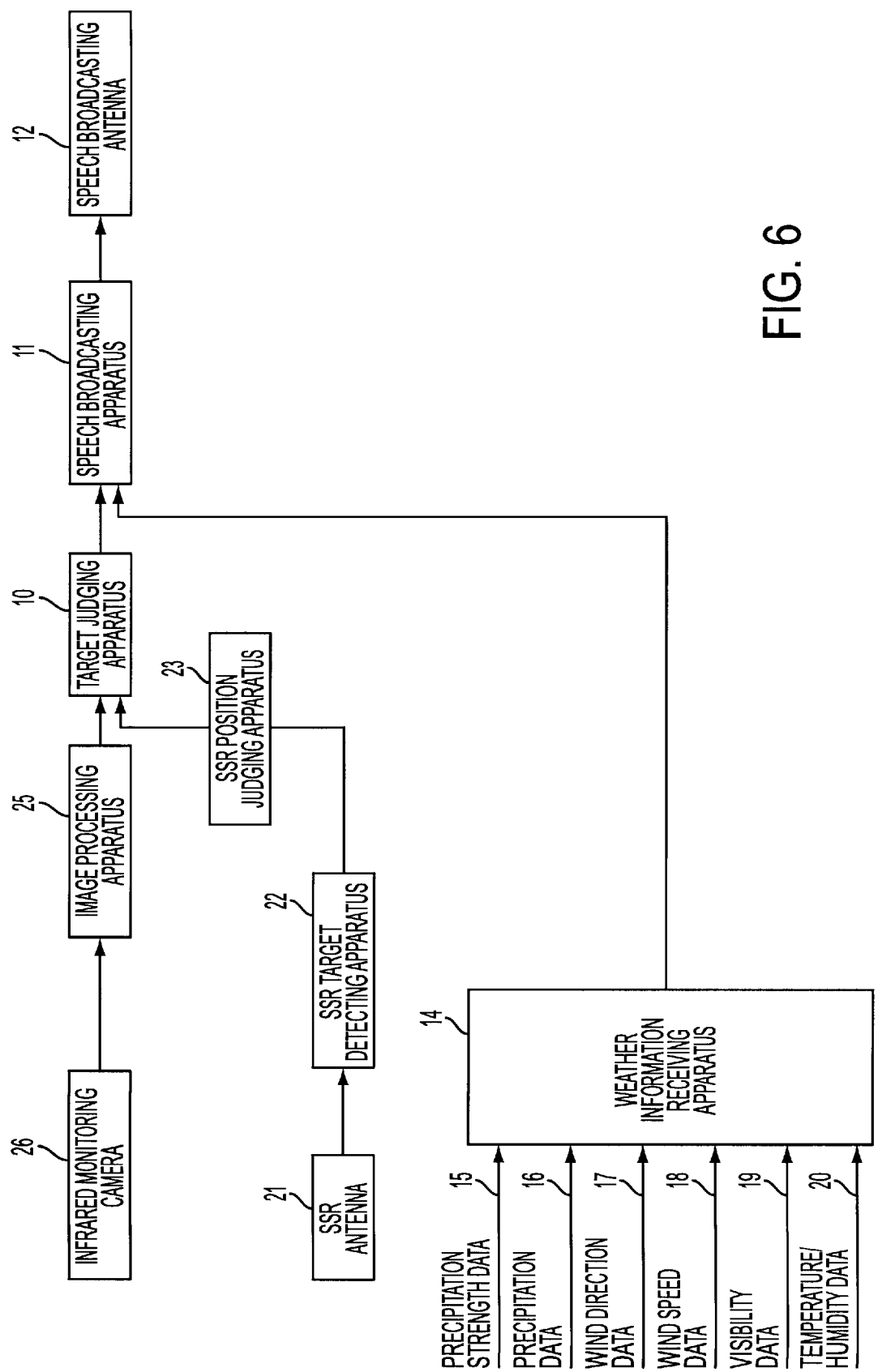
FIG. 6 is a block diagram for showing an arrangement of an automatic airport information transmitting apparatus according to an embodiment mode 6 of the present invention.

FIG. 6 is a block diagram for showing an arrangement of an automatic airport information transmitting apparatus according to an embodiment mode 6 of the present invention.

It should be noted that the same reference numerals shown in FIG. 4 will be employed as those for indicating the same, or similar elements represented in FIG. 6, and therefore, descriptions thereof are omitted. As new reference numerals, reference numeral 26 indicates an infrared monitoring camera for monitoring an inside of an airport. An image acquired by this infrared monitoring camera 26 is image-processed by way of a pattern recognition of an image processing apparatus 25, so that a target is detected.

In other words, in the above-described embodiment mode 5, the industrial monitoring camera 24 is employed as the means for detecting the positions/speeds/approximated dimensions of other aircraft existing in the airport. In embodiment mode 5, while the industrial monitoring camera 24 is used, the image signal acquired by the industrial monitoring camera 24 is processed by way of the pattern recognition by the image processing apparatus 25, so that a position, a speed, and an approximated dimension of an aircraft can be recognized. To the contrary, in this embodiment mode 6, since the industrial monitoring camera 24 is replaced by the infrared monitoring camera 26, a similar effect to that of the embodiment mode 5 can be achieved without requiring lighting facilities even in the nighttime.

As previously explained, while the infrared monitoring camera also capable of photographing the scene at night is employed instead of the industrial monitoring camera, the aircraft can be automatically detected by executing the pattern recognition of the image processing operation. Also, since the positions/moving speeds/approximated dimensions of aircraft within the airport, the precipitation, the precipitation strength, the wind speed, the wind direction, the visibility, the temperature, and the humidity are transmitted to the pilot of the aircraft under flight by way of the speech communication through electromagnetic waves, the traffic condition of the landing airport can be confirmed by the specific manner other than the visual confirming manner. Also, since the positions of the plural aircraft under flight can be grasped, the system of this embodiment mode 6 can contribute an improvement in the safety operations of the aircraft existing in the air zone around the airport and also within this airport.

Embodiment Mode 7

Figure 7:
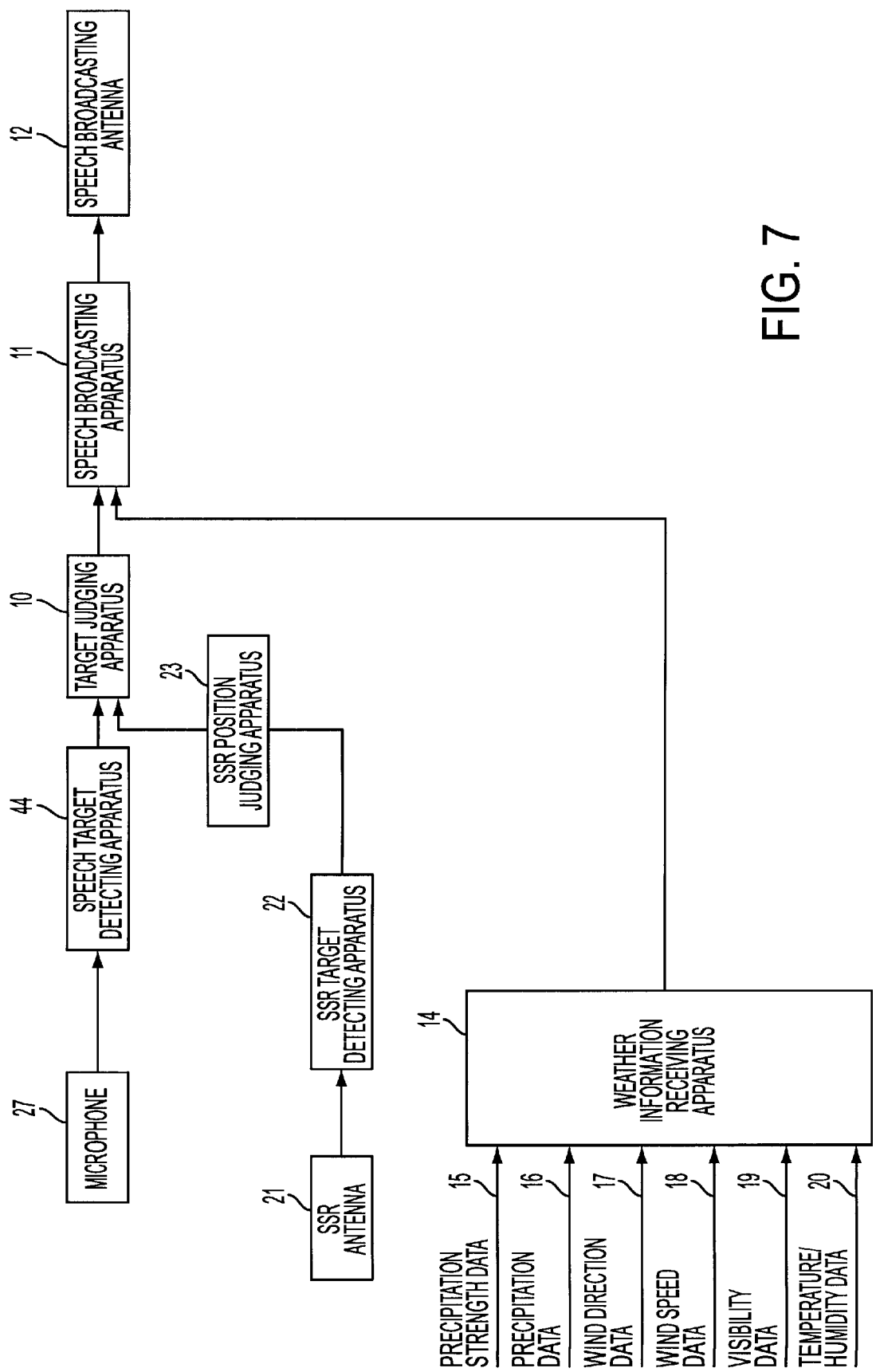
FIG. 7 is a block diagram for showing an arrangement of an automatic airport information transmitting apparatus according to an embodiment mode 7 of the present invention.

FIG. 7 is a block diagram for showing an arrangement of an automatic airport information transmitting apparatus according to an embodiment mode 7 of the present invention.

It should be noted that the same reference numerals shown in FIG. 4 will be employed as those for indicating the same, or similar elements represented in FIG. 7, and therefore, descriptions thereof are omitted. As new reference numerals, reference numeral 27 indicates a noise monitoring microphone for monitoring noises inside an airport, and reference numeral 44 denotes a speech target detecting apparatus for detecting a target present in the airport based upon a noise detection level by the noise monitoring microphone 27.

In the above-described embodiment mode 3, the ASDE is employed as the means for detecting the positions/speeds/approximated dimensions of the aircraft existing in the airport. In this embodiment mode 7, while a plurality of noise monitoring microphones 27 having strong directivities are installed within a traveling area of an aircraft such as a landing strip, a guide path, a spot within an airport, these noise monitoring microphones 27 collect the engine noise of aircraft. Then, the speech target detecting apparatus 44 detects as to whether or not the collected engine noise of the aircraft is higher than a pre-selected level, so that this speech target detecting apparatus 44 can calculate an approximated position of this aircraft existing in the airport.

Next, a basic operation idea will now be explained with reference to FIG. 10 and FIG. 12.

Plural sets of the microphones 27 shown in FIG. 10 may be installed in order to monitor an important area within the landing strip, the guide path, the spot, and so on.

Figure 12:
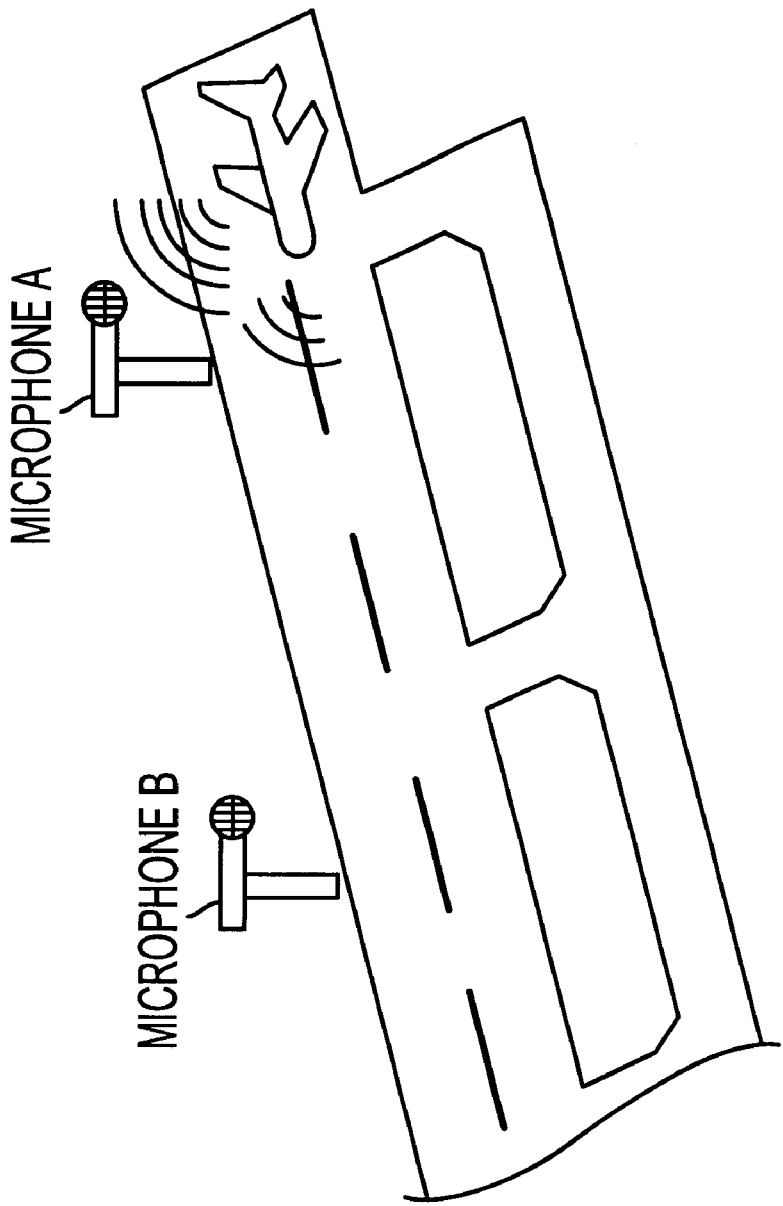
FIG. 12 is an explanatory diagram for explaining a basic idea for judging a position of an aircraft by collecting engine noise of a moving airline by a microphone.
Figure 14:
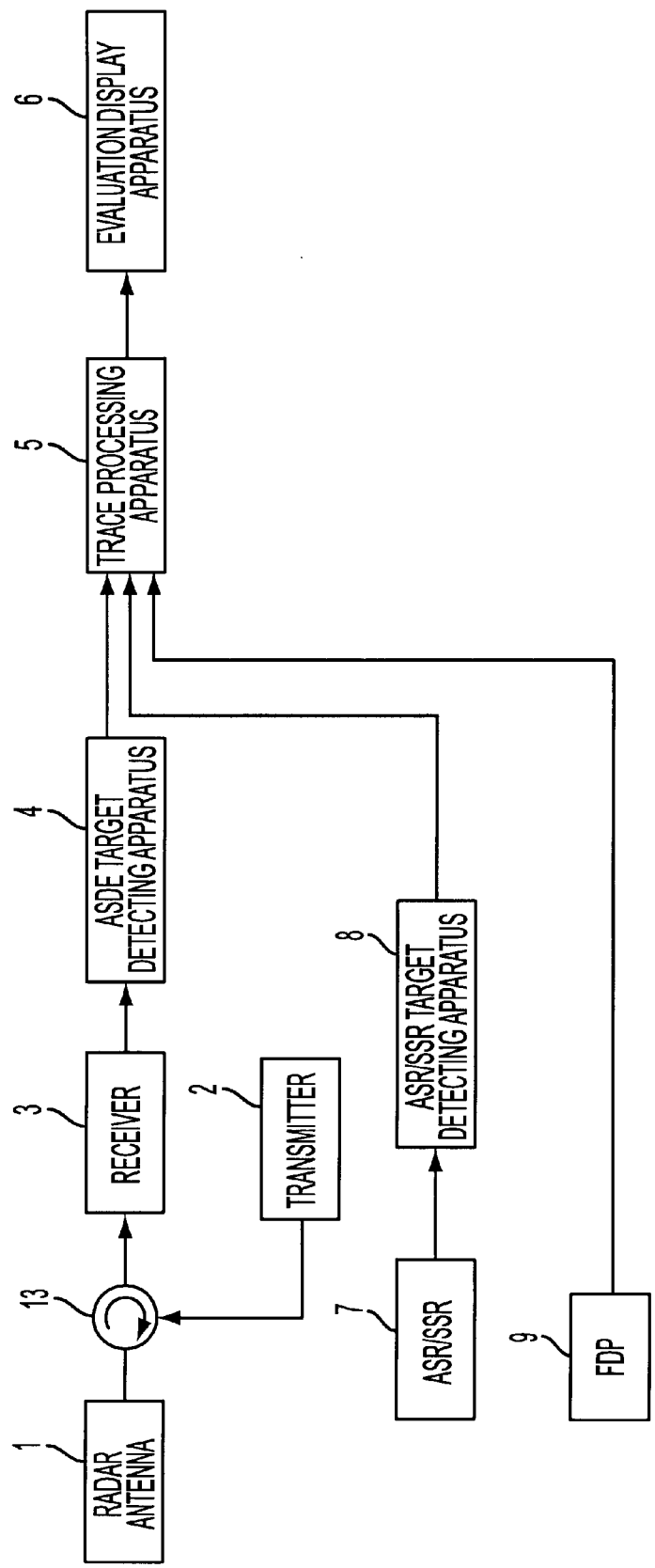
FIG. 14 is a block diagram for representing the prior art.

Also, FIG. 12 represents a basic idea capable of judging a position of an aircraft by collecting the engine noise of the aircraft under travel using the microphone 27. In this drawing, since an aircraft is travelling on the side of a microphone "A", this microphone "A" may collect sound levels higher than, or equal to a pre-selected level value. However, since there is a distance between another microphone "B" and the aircraft, this microphone "B" cannot sufficiently collect sound levels. As a consequence, the speech target detecting apparatus 44 can calculate that the aircraft under travel is present on the side of the microphone "A".

As previously explained, since the approximated position of the aircraft is judged by checking the engine noise of the aircraft within the airport using the microphones, and also the precipitation, the precipitation strength, the wind speed, the wind direction, the visibility, the temperature, and the humidity are transmitted to the pilot of the aircraft under flight by way of the speech communication through electromagnetic waves, the traffic condition of the landing airport can be confirmed by the specific manner other than the visual confirming manner. Also, since the positions of the plural aircraft under flight can be grasped, the system of this embodiment mode 7 can contribute an improvement in the safety operations of the aircraft existing in the air zone around the airport and also within this airport. Furthermore, since the microphone is used, the target within the airport can be detected by the low-cost arrangement.

Embodiment Mode 8

Figure 8:
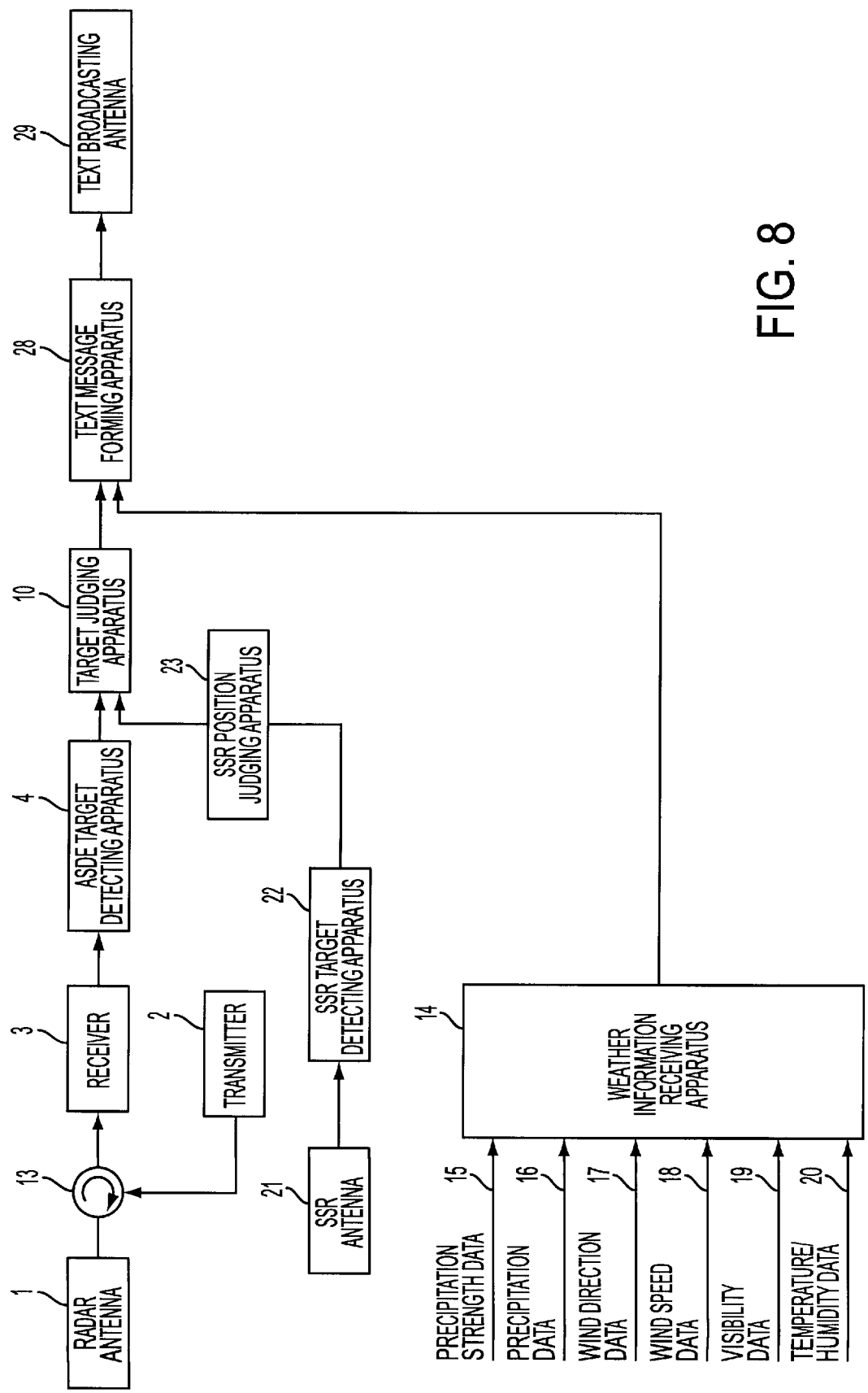
FIG. 8 is a block diagram for showing an arrangement of an automatic airport information transmitting apparatus according to an embodiment mode 8 of the present invention.

FIG. 8 is a block diagram for showing an arrangement of an automatic airport information transmitting apparatus according to an embodiment mode 8 of the present invention.

It should be noted that the same reference numerals shown in FIG. 4 will be employed as those for indicating the same, or similar elements represented in FIG. 8, and therefore, descriptions thereof are omitted. As new reference numerals, reference numerals 28 and 29 represent a text message forming apparatus and a message broadcasting antenna. The text message forming apparatus 28 forms transmission information as a message of text information and then transmits this message. In accordance with the above-explained embodiment mode 3, the various data such as the position/speed/approximated dimension of the aircraft within the airport, the precipitation, the precipitation strength, the wind speed, the wind direction, the visibility, and the temperature/humidity data, and furthermore, the positions of other aircraft under flight are transmitted to the pilot by way of the speech manner. To the contrary, in accordance with this embodiment mode 8, since the transmission information is formed as a message, this mess age can be recorded. The message is converted into a message code, and then, this message code is transmitted by using the normally mounted air radio frequency band.

Referring now to FIG. 13, a basic operation idea will be described.

FIG. 13 indicates an example in which the following messages obtained by executing the processing operation of the embodiment mode 3 are displayed. As the messages, there are positions/moving speeds/approximated dimensions of other aircraft within the airport, the precipitation, the precipitation strength, the wind speed, the wind direction, the visibility, the temperature, and the humidity and further the positions of other aircraft under flight. As explained above, since the aircraft mounts both a decoding device and a display unit on the radio apparatus, the contents of the messages can be confirmed by way of the characters.

As previously described, while the message data is coded and the coded message data is transferred by way of the speech wireless manner, since the approximated position of the aircraft within the airport, the precipitation, the precipitation strength, the wind speed, the wind direction, the visibility, the temperature, and the humidity are transmitted to the pilot of the aircraft under flight, the traffic condition of the landing airport can be confirmed by the specific manner other than the visual confirming manner. Also, since the positions of the plural aircraft under flight can be grasped, the system of this embodiment mode 8 can contribute an improvement in the safety operations of the aircraft existing in the air zone around the airport and also within this airport.

As previously described, in accordance with the present invention, since the aircraft appearing within the airport are automatically detected, and also the positions/moving speeds/approximated dimensions of the aircraft within the airport are transmitted to the pilot of the aircraft under flight by way of the speech communication through electromagnetic waves, the traffic condition of the landing airport can be confirmed by the specific manner other than the visual confirming manner, which can contribute an improvement in the safety operations of the aircraft.

Also, various data measured by weather condition measuring devices of the navigation facilities installed in the airport are entered into the weather information receiving apparatus. These weather data are precipitation (rainfall) strength data, precipitation data, wind direction data, wind speed data, visibility data, and temperature/humidity data. This weather information is added to the information related to the position/speed/approximated dimension of the target. The resultant data is converted into a speech information, and then the speech converted data is transmitted, via the aerial radio frequency band to the pilot of the aircraft under flight. As a result, the traffic condition of the landing airport can be confirmed by the specific manner other than the visual confirming manner, which can contribute an improvement in the safety operations of the aircraft.

Also, by employing the secondly airport surveillance radar apparatus (SSR) for transmitting the electromagnetic waves to the aircraft so as to acquire the beacon code of the aircraft, and also the SSR target detecting apparatus for code-converting the beacon code of the aircraft received by the SSR to output both the position of the aircraft and the beacon code, the respective airport facilities are operated only when the approaching aircraft is detected. As a result, the operation time of the respective airport facilities can be reduced, and also the security aspect related to the flights of aircraft can be maintained.

Also, the positional relationship among a plurality of aircraft under flight is calculated based upon both the positional information of the aircraft under flight and the beacon codes thereof, and then, such an information indicating as to whether or not the intervals among the plural aircraft are properly selected is transmitted. As a consequence, since the positions of a plurality of aircraft under flight can be grasped, the system of the present invention can contribute an improvement in the safety operations of the aircraft existing in the air zone around the airport and in this airport.

Also, while the industrial monitoring camera is used instead of the ASDE radar apparatus, the image taken by the industrial monitoring camera is processed by executing the image processing operation by the pattern recognition so as to calculate the position/speed/dimension of the aircraft under flight. As a result, the system of this invention can contribute an improvement in the safety operations of the aircraft existing in the air zone around the airport and also within this airport with employment of the low-cost arrangement.

Moreover, while the infrared monitoring camera also capable of photographing the scene at night is employed instead of the industrial monitoring camera, the image obtained by the infrared monitoring camera is processed by executing the image processing operation by the pattern recognition to calculate position/speed/dimension of the aircraft. As a consequence, the system of this invention can contribute an improvement in the safety operations of the aircraft existing in the air zone around the airport and also within this airport even at night.

Also, while the microphones are installed at the respective points of the airport instead of the industrial monitoring camera, a check is made as to whether or not there is an aircraft, and also an approximated position of this aircraft is calculated based upon the engine noise of the aircraft collected by these microphones. As a result, the system according to the present invention with employment of the low-cost arrangement can contribute an improvement in the safety operations of the aircraft existing in the air zone around the airport and also within this airport, while reducing the construction scale.

Also, since the message text information is transmitted as the transmission information instead of the speech information and then is displayed on the display unit, the transmission information can be recorded, which can contribute an improvement in the safety operations of the aircraft existing in the air zone around the airport and also within this airport.

Utilization in industrial field

As previously explained, in accordance with the present invention, in such a relatively small-scaled airport where no controller is present, since conditions inside an airport and conditions around this airport are automatically transmitted to an aircraft in the periphery of this airport about to land, a safety flight of this aircraft can be improved.

What is claimed is:

1. An automatic airport information transmitting apparatus comprising:

airport-inside-target detecting means for detecting a target inside an airport;

target judging means for judging a target moved in a place within the airport, which is required to surveille an aircraft based upon target position information derived from said airport-inside-target detecting means; and transmitting means for transmitting information of the target inside the airport judged by said target judging means to an aircraft which is flying around the airport in a wireless manner.

2. An automatic airport information transmitting apparatus as claimed in claim 1, further comprising:

weather monitoring means for monitoring a weather condition around the airport; wherein:

said transmitting means adds the weather information monitored by said weather monitoring means to the target information of the airport, and then transmits the resulting target information to the aircraft which is flying around the airport in the wireless manner.

3. An automatic airport information transmitting apparatus as claimed in claim 1, further comprising:

an airport surveillance radar apparatus installed within the airport, for emitting electromagnetic waves to the peripheral area of the airport and for receiving radar signals reflected from the targets to thereby surveille the peripheral area of said airport; and approaching target detecting means for detecting that a target existing in the peripheral area of the airport has approached a predetermined area within the peripheral area of the airport in response to a reception signal from said airport surveillance radar apparatus; wherein:

at least one of said airport-inside-target detecting means, said target judging means and said transmitting means commences its operation only when the detection signal derived from said approaching target detecting means is inputted thereinto.

4. An automatic airport information transmitting apparatus as claimed in claim 1, further comprising:

an airport surveillance radar apparatus installed within the airport, for emitting electromagnetic waves to the peripheral area of the airport and for receiving radar signals reflected from the targets to thereby surveille the peripheral area of said airport;

approaching target detecting means for detecting that a target existing in the peripheral area of the airport has approached a predetermined area within the peripheral area of the airport in response to a reception signal from said airport surveillance radar apparatus; and position judging means for judging a mutual positional relationship in the case that a plurality of targets are detected by said approaching target detecting means; wherein:

said transmitting means transmits positional information of other aircraft under flight to an aircraft under flight based upon the mutual positional relationship among said plurality of targets derived from said position judging means in the wireless manner.

5. An automatic airport information transmitting apparatus as claimed in claim 1 wherein:

said airport-inside-target detecting means includes:

an airport surface detection equipment radar apparatus for detecting an airport surface in response to a radar signal which is received by emitting electromagnetic waves to the inside of the airport and by reflecting the electromagnetic waves from the target; and a target detecting apparatus for detecting a position of the target in response to the output signal from said airport surface detection equipment radar apparatus to output target position information.

6. An automatic airport information transmitting apparatus as claimed in claim 1 wherein:

said airport-inside-target detecting means further includes:

an industrial monitoring camera for monitoring the inside of the airport; and an image processing apparatus for processing an image acquired by said industrial monitoring camera by way of a pattern recognition manner to thereby detect the target.

7. An automatic airport information transmitting apparatus as claimed in claim 1 wherein:

said airport-inside-target detecting means further includes:

an infrared monitoring camera for monitoring the inside of the airport; and an image processing apparatus for processing an image acquired by said infrared monitoring camera by way of a pattern recognition manner to thereby detect the target.

8. An automatic airport information transmitting apparatus as claimed in claim 1 wherein:

said airport-inside-target detecting means further includes:

a noise monitoring microphone for monitoring the inside of the airport; and a speech target detecting apparatus for detecting a target in response to a noise level collected by said noise monitoring microphone.

9. An automatic airport information transmitting apparatus as claimed in claim 1 wherein:

said transmitting means is provided with:

speech broadcasting means for transmitting transmission information by way of a speech broadcasting manner.

10. An automatic airport information transmitting apparatus as claimed in claim 1 wherein:

said transmitting means is provided with:

message transmitting means for forming transmission information as a message of text information to thereby transmit the text information message.

* * * * *